United States Patent [19]

Lassiaz et al.

[11] Patent Number: 4,667,800
[45] Date of Patent: May 26, 1987

[54] PULLED TYPE CLUTCH RELEASE MECHANISM

[75] Inventors: Philippe Lassiaz, Bonlogne; Bernard Mallet, Wittelsheim, both of France

[73] Assignee: Valeo, Paris, France

[21] Appl. No.: 599,149

[22] Filed: Apr. 11, 1984

[30] Foreign Application Priority Data

Apr. 11, 1983 [FR] France ................................ 83 05849

[51] Int. Cl.[4] .............................................. F16D 23/14
[52] U.S. Cl. .................................... 192/98; 192/89 B; 192/110 B
[58] Field of Search .................... 192/98, 110 B, 89 B, 192/70.13

[56] References Cited

U.S. PATENT DOCUMENTS 3,433,341  3/1969  Bohn et al. ............................ 192/98
4,228,882  10/1980  Huber et al. .................. 192/89 B X
4,399,898  8/1983  Olschewski et al. ................. 192/98
4,502,583  3/1985  Limbacher ................... 192/70.13 X
4,560,053  12/1985  Lassiaz ................................. 192/98
4,565,271  1/1986  Lassiaz ............................. 192/89 B

FOREIGN PATENT DOCUMENTS 2639766  3/1978  Fed. Rep. of Germany .
2454386  11/1980  France .

Primary Examiner—Rodney H. Bonck
Attorney, Agent, or Firm—Young & Thompson

[57] ABSTRACT

The inner race of a clutch release bearing is axially extended to act as an engagement element in a pull-type clutch release mechanism. The engagement element is coupled to the diaphragm of the clutch by means of a sub unit preassembled on the diaphragm and consisting of a piece for acting on the diaphragm and an elastic retention means. The engagement element is coupled to the sub unit by means of a fixing ring which is held in place by the elastic retention means.

16 Claims, 7 Drawing Figures

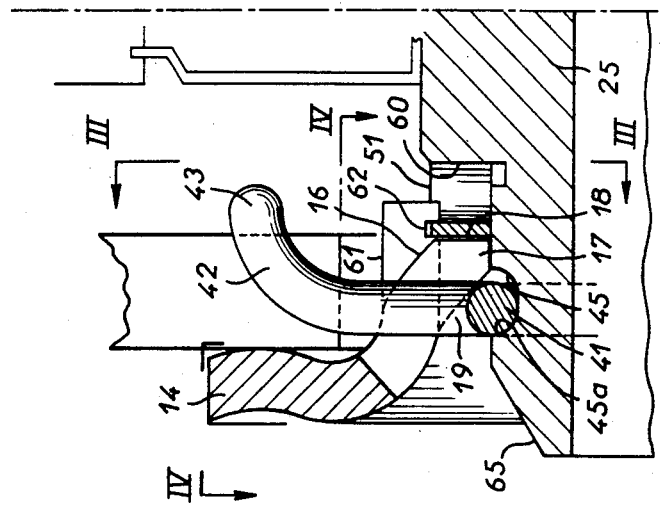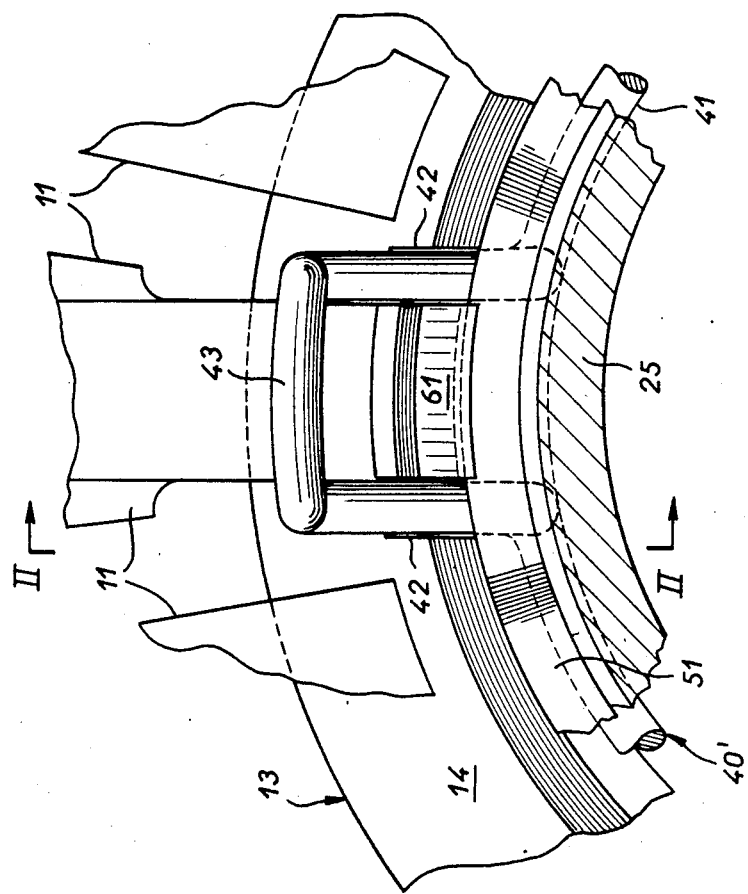

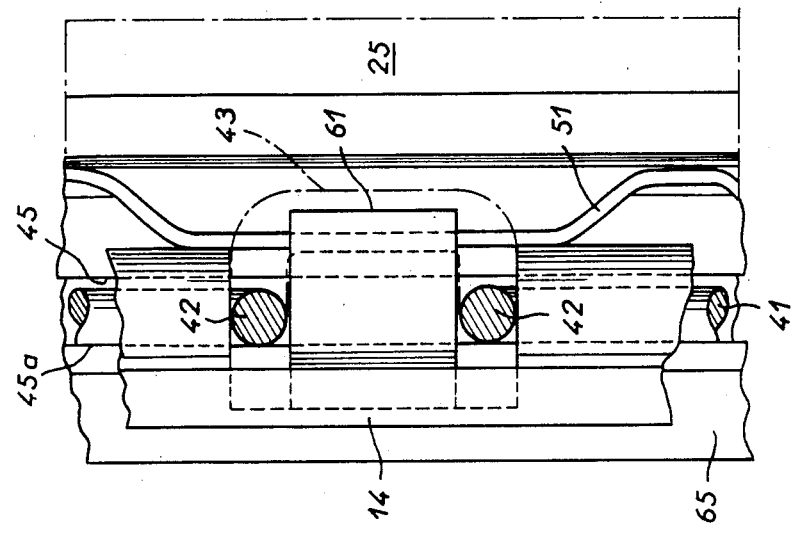
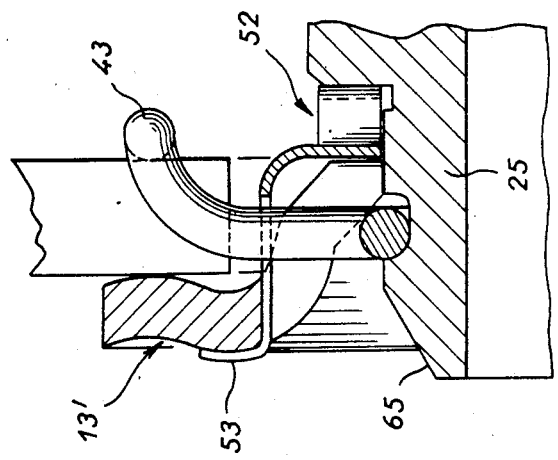

PULLED TYPE CLUTCH RELEASE MECHANISM

BACKGROUND OF THE INVENTION

The present invention relates, in general terms, to clutch release mechanisms, especially for motor vehicles, and more specifically to so-called pulled mechanisms, that is to say those intended for acting by traction on a disengaging device, such as a diaphragm, for the clutch to be controlled. The invention is concerned more particularly with the coupling between such mechanisms and the associated disengaging device.

Reference can be made, in particular, to U.S. Pat. No. 4,560,053 which describes a mechanism of this type with an engagement element designed to act by traction on the inner face of a disengaging device, such as a diaphragm, by means of an annular piece, called an active or gripping piece, a two-way connection being made between the gripping piece and the engagement element, and, in particular, the inner race of a ball bearing forming part of the clutch bearing.

In this prior device, the two-way connection could comprise, on the one hand, means of fixing the gripping piece to the engagement element and elastic retention means carried by the engagement element of the bearing and, on the other hand, retaining fingers provided on the gripping piece. Although it is substantially satisfactory, this prior arrangement is relatively complicated to produce because of a certain complexity of the gripping piece. Furthermore, it emerges that the final assembly of the clutch release mechanism with the disengaging device requires many operations, since it is necessary beforehand to assemble, on the one hand, the gripping piece on the disengaging device and, on the other hand, the elastic retention means on the bearing. Finally, it could be considered sometimes undesirable that the elastic retention means have substantially the form of Belleville washers; in fact, this results in possibilities of variations in the load on these means in the event of relative radial displacement of the bearing in relation to the disengaging device.

SUMMARY

The main object of the present invention is, therefore, to propose a method of coupling or assembling the release mechanism and disengaging device which is compact and simple to carry out and which makes use of components of simplified structure both as regards the gripping piece and as regards the two connection means interposed between the gripping piece and the clutch release bearing. According to one of its aspects, the invention also intends to avoid the abovementioned disadvantages of the elastic retention means based on Belleville washers.

In a device of the type in question, incorporating an engagement element, in particular the inner race of a ball-bearing designed to act by traction on the inner face of a disengaging device, such as a diaphragm, by means of an annular gripping piece, a two-way connection being made between this gripping piece and the engagement element, the invention thus proposes to form into a sub-unit which is preassembled with the disengaging device, the gripping piece and a washer designed to form a spring for retaining a ring fixing the gripping piece and the engagement element to one another. In practice, this ring snaps into a groove made in the engagement element, and the retaining washer ensures that this ring is wedged between one edge of this groove and a corresponding bearing surface of the gripping piece.

According to a first embodiment, the washer forming a spring is substantially a Belleville washer which comes axially up against, on the one hand, the free edge of the engagement element and, on the other hand, the gripping piece which it can advantageously separate axially from the fingers of the diaphragm, as a result of which the gripping piece does not require any antiwear treatment at this level since it no longer undergoes friction from the diaphragm.

According to another advantageous embodiment, since this preassembled sub-unit is intended to engage radially outside the engagement element of the bearing, the fixing ring extends within the gripping piece by means of radially projecting portions for securing to the disengaging device, in application of arrangements described in U.S. application Ser. No. 571,671, filed Jan. 17, 1984 and commonly assigned with the present application.

According to another preferred arrangement of the invention, the washer forming a retaining spring follows an undulating path between a radially oriented bearing surface of the gripping piece designed to face a parallel bearing surface formed for this purpose by a shoulder of the engagement element.

The advantages of this arrangement are, in particular, that it reduces the bulk, in a radial direction, of the device coupling the gripping piece to the engagement element of the bearing and that it locates the action of the elastic retention means on the clutch release bearing at a radially lower level than that of the zone of contact of the gripping piece with the disengaging device, in particular a bearing collar provided on the said piece.

Moreover, the subjects, characteristics and advantages of the invention emerge from the following description given by way of example and with reference to the attached drawings in which:

BRIEF DESCRIPTION OF THE DRAWINGS

FIG. 2 is a partial diagrammatic view in axial section along the line II—II of FIG. 3 of a mechanism according to a further embodiment;

FIG. 3 is a partial view according to the arrow III of FIG. 2 of a portion of the mechanism;

FIG. 4 is a detailed view along the broken line IV—IV of FIG. 2; and

FIG. 5 is an alternative form of the mechanism shown in FIG. 2.

DETAILED DESCRIPTION OF EMBODIMENTS OF THE INVENTION

According to the embodiments chosen and illustrated, a clutch release mechanism 10 (FIG. 1) is coupled in terms of traction to the disengaging device 11 of any clutch to be controlled.

In the practical forms shown more particularly, the disengaging device 11 is formed, in a way known per se, by the end of the radial fingers of a diaphragm, that is to say an annular piece which, belonging to the clutch to be controlled, has a circularly continuous peripheral part forming a Belleville washer, to stress this clutch in the direction of engagement, and a central part divided into such radial fingers, to form such a disengaging device.

In order to couple the clutch release mechanism 10 to the disengaging device 11, and to enable the clutch release mechanism 10 to act in traction on the disengaging device 11, a gripping piece 13 is attached to the latter by means of the central orifice 12 formed therein.

Figure 1:
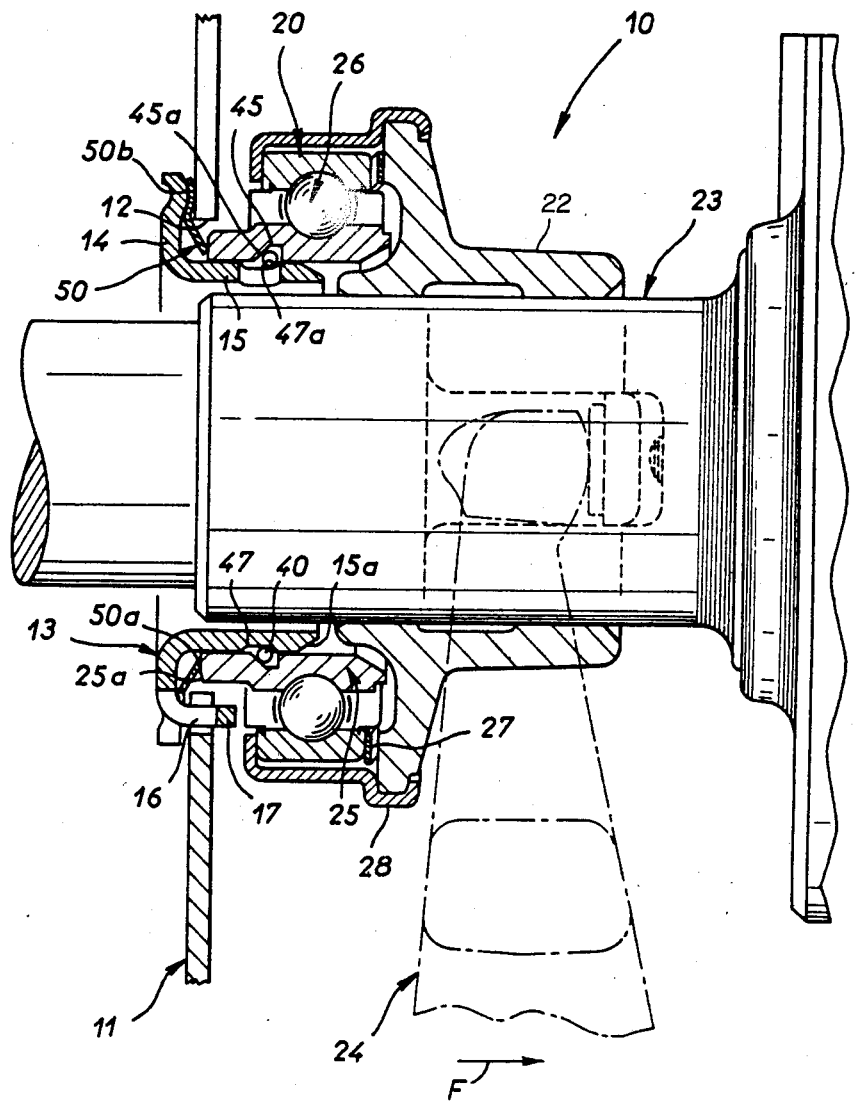
FIG. 1 is a view in axial section of a clutch release mechanism according to a first embodiment of the invention.

The clutch release mechanism 10 substantially comprises, in a way known per se, a rotary bearing 20, by means of which it is designed to act on the disengaging device 11 via the gripping piece 13; an actuating element 22 by means of which it is intended, in the embodiment illustrated in FIG. 1, to be mounted so as to slide axially on guide member 23 and by means of which, moreover, it is designed to be actuated by a control member 24 consisting, for example, as indicated by broken lines in FIG. 1, of a clutch fork; and coupling means which secure the said rotary bearing 20 axially to the said actuating element 22.

In a way also known per se, in the embodiments illustrated the rotary bearing 20 is provided with ball bearings 26. To interact with the gripping piece 13, the inner race of the rotary bearing is extended axially in the direction of the disengaging device 11 and comprises an engagement element 25.

In a conventional way, the means securing the rotary bearing 20 and actuating element 22 to one another comprises a casing 28 forming a cap and, when the clutch bearing is self-centred with self-centring being maintained, axially acting elastic means 27 consisting, for example, as illustrated, of a corrugated washer 27 of the type sold under the brand name "ONDUFLEX", an annular play being provided between the cap 28 and the outer race of the bearing. Between the engagement element 25 of the clutch release mechanism and the gripping piece 13 carried by the disengaging device 11, there are means of fixing in terms of traction which are designed to make an axial connection between the said pieces in the axial direction as indicated by the arrow F in FIG. 1. In the examples illustrated, these means consist of a ring, denoted by the general reference numeral 40, which interacts with an annular groove 45 made in the engagement element 25. In a conventional way, elastic means designated by the general reference numeral 50 are provided to wedge the ring 40 between one edge of the groove 45 and a corresponding bearing surface of the gripping piece.

According to the invention, these elastic means, usually consisting of an elastic washer forming a spring, are incorporated in a sub-unit comprising the gripping piece preassembled on the disengaging device.

Referring now more specifically to FIG. 1, a gripping piece 13 of the type described in U.S. Pat. No. 4,565,271 is shown.

On the side of the disengaging device 11 opposite the clutch release mechanism 10, this gripping piece has a radial bearing collar 14, which is profiled so that it can act on the disengaging device 11. The piece 13 has, in one piece with this collar 14, a casing 15 which, extending substantially axially, passes axially through the disengaging device 11 by means of its central orifice 12. Spaced lugs 16 projecting axially from the collar 14 carry circumferentially extending retaining fingers 17 designed to ensure, in interaction with the bearing collar 14, that the unit as a whole is retained axially on the disengaging device 11. Suitable radial prepositioning is achieved by interaction with a notch provided for this purpose in the disengaging device opposite each lug.

As described in U.S. Pat. No. 4,565,271 mentioned above, such a gripping piece 13 can be installed very simply on the disengaging device 11 by temporarily bending the ends of as many fingers of the diaphragm 11 as this gripping piece 13 has retaining fingers in an axial direction, and then by rotating the gripping piece 13 about the axis of the unit as a whole so as to brng these retaining fingers 17 in line with those fingers of the diaphragm 11 which are adjacent to the previously bent fingers of the latter, before these are released.

In the example illustrated in FIG. 1, the casing 15 is engaged inside the engagement element 25, so that the fixing ring interacts, on the one hand, with the abovementioned groove 45 made in the inner face of the engagement element 25 and, on the other hand, with a groove 47 made opposite the outer surface of the casing 15. These grooves have flanks, one (45a) being inclined and the other (47a) matching the profile of the ring, between which the ring 40, which here is an annular ring elastically deformable radially and with a circular cross-section, for example a metal ring opened radially by means of a slit intended to make it easier to fit it, is wedged under the effect of the washer 50 forming a retaining spring: in this way, any axial play between the pieces 13 and 25 at the level of the said ring 40 is cancelled.

This washer 50 is an axially acting elastic means designed to stress the ring permanently against the two abovementioned flanks. It has substantially the form of a Belleville washer which is laid by means of its inner edge 50a against the edge 25a of the engagement element 25 and by means of its peripheral zone 50b against the bearing collar 14 the profile of which it matches locally. This peripheral zone 50b is interrupted opposite the lugs 16 of the gripping piece.

This relative arrangement between the gripping piece 13 and the washer 50 has a two-fold advantage. On the one hand, the washer 50 is thus held captive axially between the piece 13 and the diaphragm 11, resulting in preassembly of this washer with the gripping piece 13 on the diaphragm 11, and, on the other hand, this washer protects the gripping piece from any friction with the diaphragm. This avoids the need to provide anti-wear surface treatment for the collar 14, thus consequently reducing the production cost of the latter. It should be noted that this washer 50, which, in practice, is itself made of spring steel, withstands wear caused by the diaphragm in a satisfactory way.

In the exemplary embodiment of FIG. 1, the sub-unit formed by the gripping piece 13 and the washer 50 is assembled with the engagement element 25 as follows. The casing 15 is engaged axially inside the engagement element 25, in the groove 45 of which the fixing ring 40 has previously been fitted. The latter is then expanded radially towards the inside of the groove 45 under the thrust of a frustoconical chamfer 15a made at the end of the casing 15. The ring 40 moves completely within the groove 45 and then retracts elastically when the grooves 45 and 47 come opposite one another.

Figure 1A:
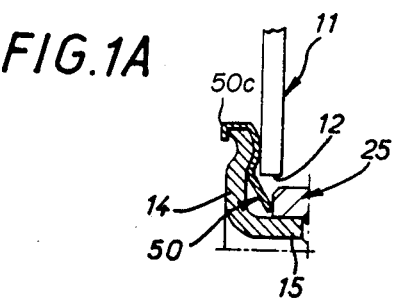
FIG. 1A is a fragmentary axial section view of another embodiment of elastic retention means.

In an other alternative form shown in FIG. 1A, the washer 50 also incorporates lugs 50c which are made on its periphery and which are designed to pass round the outer edge of the collar 14 until they hook onto its flank opposite the clutch release bearing, so that the washer 50 is fixed to the collar.

Figure 1B:
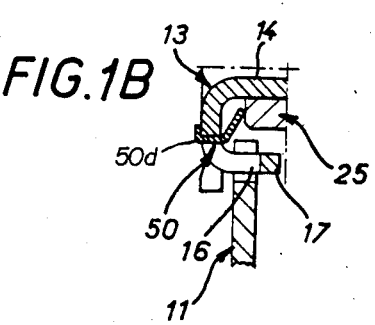
FIG. 1B is a view similar to FIG. 1A but showing still another embodiment.

In an alternative form shown in FIG. 1B, the washer 50 no longer has a peripheral zone interposed between the bearing collar 14 and the diaphragm 11, but has lugs 50d comparable to those of FIG. 1A, with the exception tht they pass through the bearing collar radially inside the annular zone of contact between the gripping piece 13 and the diaphragm 11.

FIGS. 2 to 4 illustrate another embodiment in which the gripping piece 13 engages outside the engagement element 25, and the retaining groove 45 designed to receive the fixing ring is, in this case, made in the outer surface of the said engagement element 25.

The ring, which will be designated 40' to distinguish it from that of FIG. 1, is designed to "girdle" at least some of the fingers of the diaphragm. This ring is of the type described with reference to FIGS. 9 to 13 of said U.S. Ser. No. 571,671. It comprises a running part 41 interacting with the groove 45, substantially radial curved portions 42 designed to come circumferentially on either side of a finger of the diaphragm by means of the slits separating them from the other fingers, and connected to one another by a bar 43 extending circumferentially along the said finger opposite the collar 14 of the gripping piece 13.

The gripping piece 13 incorporates, as before, a bearing collar 14 for acting on the fingers of the diaphragm by traction, consequently opposite to the bars 43 of the ring 40. The collar is extended towards the axis of the clutch release bearing by means of a casing 16 converging towards the inside of the said bearing.

The casing 16 is limited by a cylindrical annular surface 17 forming a bearing surface sliding on the engagement element 25, by a transverse surface 18 oriented towards the rotary bearing 20 and by a frustoconical surface 19 designed to press the running part 41 of the ring against a flank 45a of the groove 45. For this purpose, an axially acting elastic washer 51 corrugated axially is interposed with compressive prestress between the abovementioned transverse bearing surface 18 and a parallel bearing surface 60 on the engagement element 25. Because the ring 40' remains laid in its groove 45 under the effect of this washer 51, the latter forms a retaining spring. Since this washer 51 bears on the bearing surfaces 18 and 60 by means of transverse zones, its action is not affected by a slight offset between it and the engagement element 25.

In places, the frustoconical casing 16 has axially extending lugs 61 which possess on their inner face a groove designed to hook onto the spring 51. In the examples illustrated, the axial lugs 61 pass under the bars 43, thus ensuring good rigidity of the unit as a whole 13, 40', 11.

In this way, before the disengaging device 11 is assembled on the engagement element 25, the washer 51 intended to form a retaining spring for the fixing ring 40' is incorporated in a sub-unit comprising the gripping piece 13 preassembled on the disengaging device 11. It should be noted that, in contrast to FIG. 1, the fixing ring 40' is also incorporated in the said sub-unit, so that this sub-unit brings together all the coupling elements of the clutch release bearing.

This sub-unit is assembled on the engagement element 25 in a way somewhat similar to that described with reference to FIG. 1, with the exception that the frustoconical chamfer designated by 65, which is intended to expand the fixing ring 40' elastically in a radial direction during the engagement of the gripping piece 13 round the engagement element 25, is made on the latter here.

FIG. 5 differs from the embodiment of FIGS. 2 to 4 in that the connection between the gripping piece 13 and the washer forming a retaining spring, designated by 52, is made here not by lugs 61 integral with the gripping piece, but by substantially axial lugs 53 provided from place to place on the periphery of the spring 52 for this purpose.

It is understood that the foregoing description has been given only by way of non-limiting example and that many alternative embodiments can be proposed by a person skilled in the art, without departing from the scope of the invention. Thus, there can be any number of lugs 16, 61 or 53 and any number of bars 43 of the ring 40'. Other forms of means for fixing the gripping piece to the clutch release mechanism and of elastic means for retaining these, which are designed to make a two-way connection between the piece and the bearing, are of course possible.

In the event that the gripping piece 13 engages outside the engagement piece 25, in an embodiment similar to that of FIG. 1 the retaining spring 50 can be arranged axially on the side of the gripping piece opposite the rotary bearing, so that its radially inner edge is opposite the edge of the engagement element 25. It can still be fastened to the gripping piece by means of hook-on lugs which pass, for example, through the bearing collar.

We claim:

1. A pull-type clutch release bearing assembly for a diaphragm spring including a plurality of radial fingers with radial slots therebetween, comprising a pull-type clutch release bearing having an operating member adapted to be controlled by a control element and a drive element adapted to cooperate with the diaphragm spring, an annular gripping piece mounted on free ends of the radial fingers of the diaphragm spring, said gripping piece comprising a cylindrical portion received radially inwardly of said drive element and a transverse bearing collar cooperable with an inner surface of said diaphragm spring axially remote from said clutch release bearing, axially acting elastic retention means for defining a preassembled sub-unit with the diaphragm spring and said gripping piece and for biasing said drive element relative to said gripping piece, and a wire-like fixing ring fixing said gripping piece to said drive element, radially opposed grooves in register formed in said cylindrical portion and said drive element respectively for accommodating at least part of said fixing ring, said elastic retention means bearing directly against said drive element to wedge said fixing ring between said gripping piece and said drive element.

2. An assembly according to claim 1, wherein said elastic retention means comprises an elastic washer secured relative to said transverse collar of said gripping piece and bears on a radial edge of said drive element facing in the direction of said diaphragm spring.

3. An assembly according to claim 2, wherein said elastic washer has a radial portion clamped between the diaphragm spring and said bearing collar, thereby defining wear protection means for said diaphragm spring.

4. A diaphragm pull-type clutch release bearing and a diaphragm spring assembly, comprising a diaphragm spring including a plurality of radial fingers with radial slots therebetween, and a pull-type clutch release bearing having an operating element adapted to be controlled by a control element and a drive element adapted to cooperate with said diaphragm spring, an annular gripping piece received on free ends of the radial fingers of said diaphragm spring, said gripping piece including a transverse bearing collar cooperable with an inner face of said diaphragm spring, axially remote from said release bearing and an axial sleeve received radially inwardly of said drive element, a fixing ring fixing said gripping piece to said drive element, means accommodating at least part of said fixing ring between said axial sleeve and said drive element, elastic retention means including a spring washer axially biasing said drive element away from said bearing collar, a radial portion of said spring washer being clamped between said bearing collar and said diaphragm spring and defining wear protection means for said diaphragm spring fingers.

5. A pull-type clutch release bearing assembly for a diaphragm spring including a plurality of radial fingers with radial slots therebetween, comprising a pull-type clutch release bearing having an operating element adapted to be controlled by a control element and a drive element adapted to cooperate with the diaphragm spring, an annular gripping piece received on free ends of the radial fingers of the diaphragm spring, axially acting elastic retention means for defining a preassembled sub-unit with the diaphragm spring and said gripping piece and bearing against said drive element and for biasing said drive element relative to said gripping piece, and a wire-like fixing ring fixing said gripping piece to said drive element, means accommodating at least part of said fixing ring between said gripping piece and said drive element, said elastic retention means wedging said part of said fixing ring between said gripping piece and said drive element.

6. An assembly according to claim 5, wherein said gripping piece comprises a transverse bearing collar on an inner side of the diaphragm spring and said fixing ring has another portion cooperable with a selected one of said radial fingers of said diaphragm spring on an outer surface thereof, opposite a transverse bearing collar whereby the assembly including said fixing ring, elastic retention means, said gripping piece and said drive element gripped on the selected one of the radial fingers between said other portion of said fixing ring and said gripping piece provides a two-way connection.

7. An assembly according to claim 5, wherein said gripping piece comprises a transverse bearing collar cooperable with an inner surface of said diaphragm spring, and a tapering portion, said means for accommodating said fixing ring including an inclined surface on said tapering portion.

8. An assembly according to claim 5, wherein said elastic retention means bears against opposed radial surfaces on said gripping piece and said drive element.

9. An assembly according to claim 8, wherein said gripping piece has axial lugs hooked onto said spring washer.

10. An assembly according to claim 8, wherein said spring washer has axial lugs hooked onto said gripping piece.

11. Assembly according to claim 5, wherein said elastic retention means bears against said drive element and said gripping piece radially inwardly of contact between said gripping piece and the diaphragm spring.

12. An assembly according to claim 11, wherein said elastic retention means comprises a circumferential undulating spring washer.

13. An assembly according to claim 5, wherein said fixing ring has at least one radially projecting lobe receiving the selected one of the radial fingers.

14. An assembly according to claim 5, wherein said fixing ring has at least one radially projecting lobe straddling the selected one of the radial fingers.

15. An assembly according to claim 14, wherein said lobe has substantially radial portions joined by a substantially circumferential portion, said radial portions being in circumferential alignment with the radial slots between selected ones of the radial fingers.

16. An assembly according to claim 5, wherein said gripping piece has a bearing collar cooperable with an inner surface of the diaphragm spring and a tapering portion extending inwardly of said radial fingers, said means accommodating a point of said fixing ring including said tapering portion, said fixing ring having a radially extending lobe crossing in cross section, said tapering portion and straddling a selected one of said radial fingers opposite said bearing collar.

* * * * *